AKINS & BURRITT.
Calendar Clock.
No. 18,665.
2 Sheets—Sheet 1.
Patented Nov. 17, 1857.
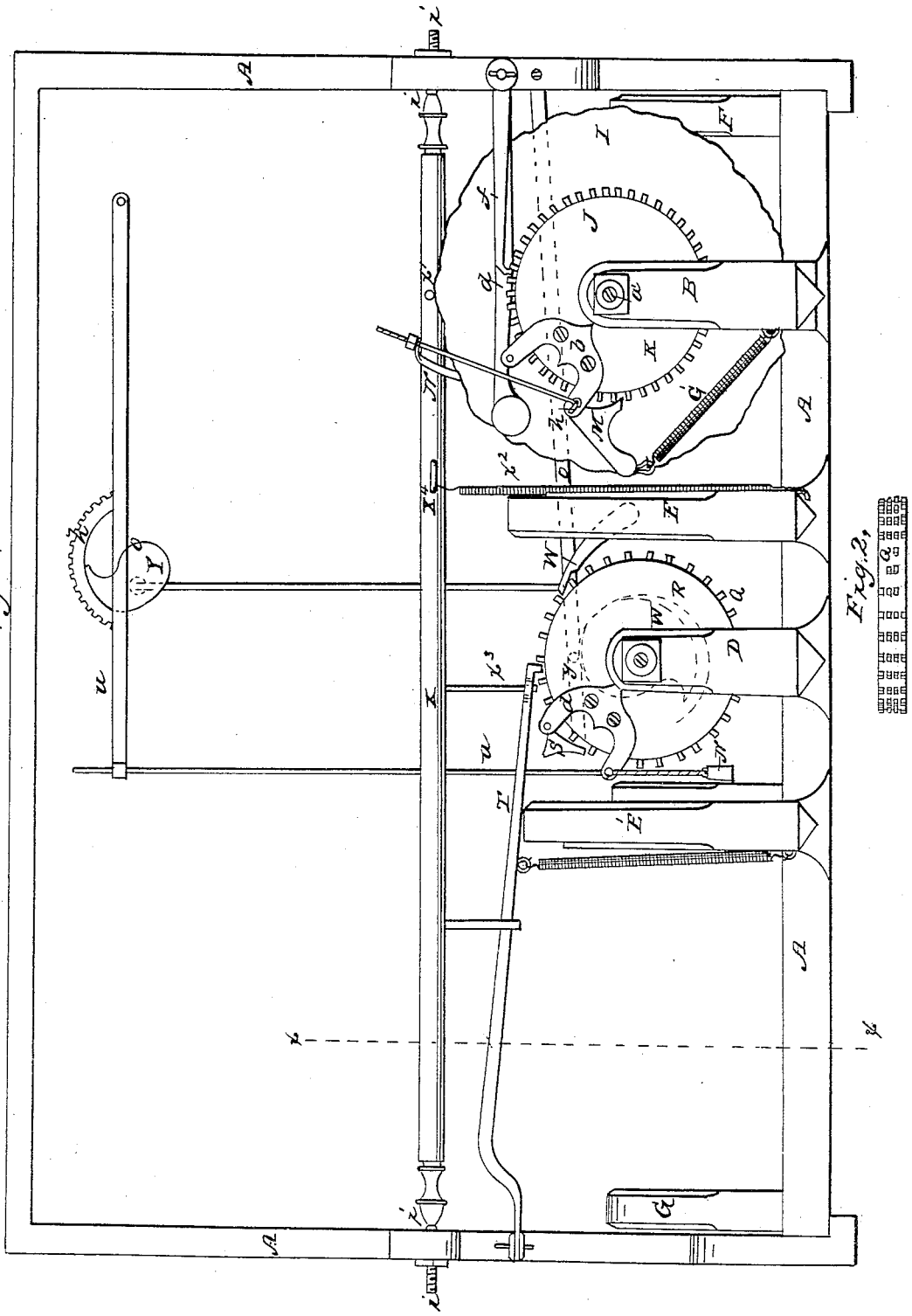

AKINS & BURRITT.
Calendar Clock.
No. 18,665.
2 Sheets—Sheet 2.
Patented Nov. 17, 1857.
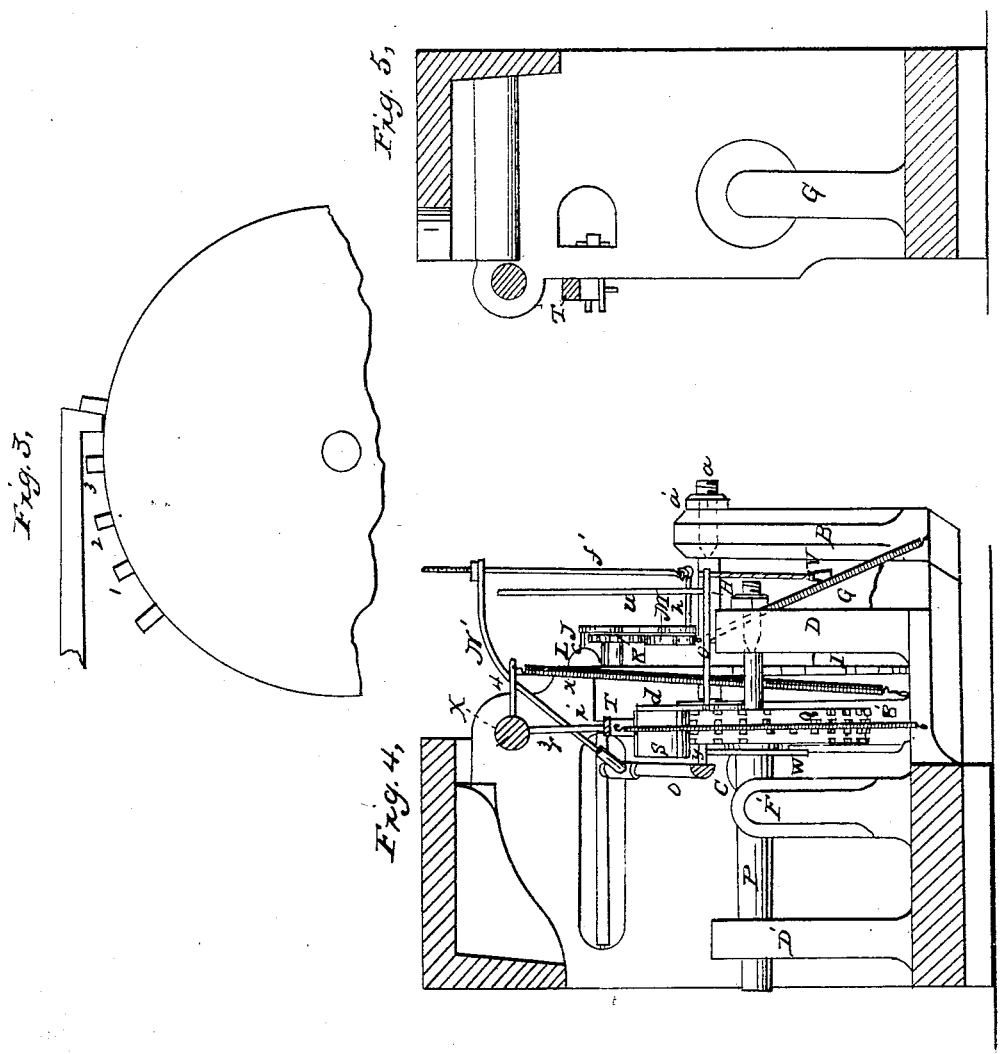

UNITED STATES PATENT OFFICE.

WM. H. AKINS, OF BERKSHIRE, AND JOS C. BURRITT, OF ITHACA, NEW YORK, ASSIGNORS TO WAIT T. HUNTINGTON AND HERVEY PLATT, OF ITHACA, NEW YORK.

CALENDAR-CLOCK.

Specification of Letters Patent No. 18,665, dated November 17, 1857.

*To all whom it may concern:*

Be it known that we, WILLIAM H. AKINS, of Berkshire, in the county of Tioga, and JOSEPH C. BURRITT, of Ithaca, in the county of Tompkins, State of New York, have invented a certain new and useful Improvement in Calendar-Clocks, of which the following is a full, clear, and exact description, reference being had to the accompanying drawings of the same, and making part of this specification, in which—

Figure 1, represents a rear elevation of that part of the calendar movements which embraces our present improvement; Fig. 2, a plan of the day of the month wheel; and Fig. 3, a side elevation of a modification of the same. Fig. 4, represents a vertical section taken through the line $x$, $x$, of Fig. 1, looking toward the day of the month wheel; and Fig. 5, a similar view taken through the same line but looking in the opposite direction.

Our invention relates to a new and simple mode of yielding the twenty-ninth day of February in leap year whereby the complicated motions that have rendered calendar clocks so costly, and worthless from their exceeding liability to get out of order, are dispensed with.

We are aware that a disk having a series of indentations and prominences equal to the twelve months of the year has been used heretofore for the purpose of yielding the respective number of days in each month of an ordinary year, as it performs its annual revolution, and that in combination with this disk there has been used another disk having three projections upon its periphery but revolving one twelfth faster by means of suitable mechanical arrangements, so that, every fourth year one of these projections will have been brought opposite the notch for the month of February of the annually revolving disk, thus lessening its depth, for the purpose of yielding the twenty-ninth day of February in leap year. But such a device as this is not only complicated in its motions and liable to derangement of its parts, but it also requires a considerably greater amount of power to keep it in operation as is the case with all others having compensating motions for this purpose.

Our improvement consists in using a disk having a series of elevations and depressions equal in number to the forty-eight months in every bisextile term, (those elevations or depressions which are extended to twice their usual extent where two months of the same number of days come together, being reckoned as two), and revolving once every four years, it being caused to perform one forty-eighth part of its revolution at midnight on the expiration of the last day of each month; so that supposing the arm of the rockshaft that changes the detent of the day of the month wheel to be resting upon the projection on the corrugated disk for the month of January, at 12 o'clock p. m. of the 31st day of that month, the disk will traverse one-forty-eighth part of its revolution, the arm of the rockshaft being then at rest upon the corresponding projection for the month of February, the detent having been simultaneously changed from the row of 31 teeth to that having twenty-eight, unless it should happen to be leap year when it would have been transferred to a row having twenty-nine teeth, by a suitable notch or projection for that purpose, according to the location of the row, upon the disk. These notches or projections for the various months when a rockshaft is used for communicating the necessary changes to the detent upon the day of the month wheel being determined by the location of the various rows of teeth, they being, in this instance, four in number, having 31, 30, 29, and 28 teeth respectively, for the months having the corresponding number of days. This being also dependent upon the side of the rock shaft upon which its arm and the disk is located. If for example we place the row of 31 teeth on that side of the periphery of the wheel requiring the highest projections of the disk to retain the detent in it and place the other rows of 30, 29, and 28 teeth next to it in numerical order, then the projections upon the disk must be made respectively less prominent, for each of those months having the corresponding number of days; the bearing for the month of February in this example as compared with the months of January and March forming the base of a notch of which the projections of the former form sides; and vice versa had the row having 31 teeth and the others in numerical order been arranged on the opposite side of the periphery, the months having 31 days then requiring the lowest notch or depression, and so, on the same principle with any other arrangement of the rows. But as in the cases of the months of July and August, as with those of December and January where two months come together having the same number of days, instead of forming a projection or depression for each month, a single one is, or may be, made, but of a length equal to twice that of a single one or equal to the twenty-fourth part of the whole, the arm of the rockshaft resting upon its first half during the first of these months respectively and on the next half during the second.

To enable others skilled in the art to make, construct, and use our invention, we will now proceed to describe its construction and operation omitting such parts of the clock and remaining calendar movements as are unnecessary for the full understanding of our improvement as they are fully described in a patent granted to us on the nineteenth day of September A. D. 1854.

In the accompanying drawings A, A, represent that part of the frame work of the clock that supports the calendar movements and which is or may be made of cast metal. Upon the lower cross piece of this frame are erected a number of standards B, B', C, D, D', E, E', F, F', and G, that support the calendar movements.

Through the upper end of the stand B, is passed a screw ($a$) supporting on its point one end of the shaft H, upon which are mounted the corrugated disk I, and disk plate J, the latter being free to turn upon the shaft, while the former is keyed fast thereto; the other end of the shaft being supported and turning upon a pivot point secured to the upper end of the shaft B'. The screw ($a$) serves to tighten the shaft to the requisite degree between its bearings, while it in turn is held or prevented from turning by means of a lock nut ($a'$). Upon the side of the corrugated disk (I), between it and the plate (J), is rigidly secured a wheel (K), having forty-eight teeth, one for each month in every bisextile term. To the loose disk J, is secured a plate ($b$,) having two lugs projecting over its side, through the upper one of which is passed a pin ($c$,) for the purpose of raising a weighted lever (L), pivoted upon a stud ($e$,) on the side frame, and having a pin ($d$,) secured to its side which when the lever is allowed to drop as the lug revolves with the disk, engages with the teeth on the wheel (K), and prevents it from being revolved more than one tooth at a time. Upon the pin ($e$) is mounted a pawl ($f$) which engages with the teeth of the wheel K, to prevent it revolving backward but beveled on its inner face to allow it to override the teeth as it is revolved forward. Through the other lug of the plate ($b$,) is passed a pin ($h$,) to one end of which is pivoted a click (M,)' which also engages with the teeth of the wheel (K), the other end of the click being secured to a spring (G,) which serves to keep it engaged with the teeth of the wheel and to revolve the same for a purpose to be hereinafter described. The other end of the staple or pin ($h$,) being connected by means of a rod ($f'$,) to an arm N, secured upon an oscillating lever O, mounted upon pivots ($i$, $i$,) in the side frame. The forward end of this lever having a pin ($y$) secured to its side which rests upon a snail cam (W) mounted upon and secured to the shaft (P), of the day of the month wheel Q. The shaft P, being supported by the stands (D and D') in a similar manner at one end as the shaft of the corrugated disk (I.) Upon the periphery of the wheel Q, are cut four rows of teeth, one of 31 teeth for the months having 31 days, another having 30, for those having 30 days, another with 29, for the month of February in leap year, and the other 28, for the month of February in ordinary years. Upon the shaft P, and at the side of the wheel Q, is mounted a loose disk (R), to which is secured a plate ($d$,) having two projections similar to those on the plate ($b$,) to the upper one of which is attached a click (S) which engages with the teeth on the wheel (Q), as it is raised by the rod ($u$), and disengages the detent (T) from its teeth, the lower lug being provided with an arm ($o$,) from which is suspended a weight (V) for a purpose to be hereinafter described. To this arm is attached one end of a connecting rod ($u$) the other being secured to a lever (U) operated by a snail cam (Y) mounted upon the shaft of a wheel (Z) connecting the calendar with the time movements and revolving once in twenty-four hours.

X, represents a rock shaft supported upon the points of two screws ($v$ $v$) in the side frames having three arms secured thereto, two being secrued, at the side in a line with each other, while the other is on the under side and at right angles thereto.

The revolution of the snail cam (Y) with the shaft of the twenty-four hour wheel (Z) which connects the time with the calendar movements, raises up the click (S) one tooth on the day of the month wheel by means of the connecting rod ($u$) and lever (U) the click as it is raised, disengaging the detent (T) from the teeth of the wheel (Q) thus permitting the latter to be revolved when the cam shall have passed from under the lever (U) by the gravity of the weight (V) attached to the arm ($o$) on the loose disk (R), the detent dropping down again and engaging with the next tooth the moment that the support of the click (S) has been withdrawn, in revolving the wheel as described. This operation is continued daily until arrival of the last day of the month when the pin (y) on the side of the lever (O) will be resting upon the apex of the snail cam (W) on the shaft of the wheel (Q) and which will have passed completely from under the lever (O) at 12 o'clock p. m. of that day, when it will fall, allowing the spring (G') to drag down the click (M) revolving the wheel (K) to the side of which the corrugated disk (I) is secured, one tooth, the click (M) having been previously raised so as to engage with the next tooth above it by the lifting up of the arm (N) as the lever (O) is raised by the revolution of the snail cam (W). The pin (c) on the upper arm of the plate (b,) having disengaged the detent pin (d), from the teeth of the wheel (K), by lifting up the arm (L) to which it is attached, as the click was raised by the lifting up of the arm of the lever (O). The lever (L) dropping again into place, so that its detent (d) shall again engage with the teeth of the wheel (K) the moment the pin (c) is withdrawn from under it, as the click causes the wheel to perform one forty-eighth part of a revolution by the tractive power of the spring (G). But as the lifting of the click by the revolving of the disk (J) to which it is attached has a tendency to revolve the wheel backward, a pawl (f) takes into its teeth in such a manner as to prevent it from rotating backward. The same being the case with the wheel (Q) as a pawl (w) engages with its teeth for the same purpose.

The disk (I) being rigidly secured to the wheel (K) and the latter being caused to perform one forty-eighth part of a revolution at the expiration of every month, it will be apparent that the former will also perform a revolution in the same time; and being provided with a number of elevations and depressions on its periphery, it causes the arm ($x'$) of the rockshaft (X) which rests upon it to rise and fall as it is raised by a ridge or dragged down into a notch by the action of the spring ($x^2$). The effect of this action upon the rockshaft causing the arm ($x^3$) to carry the detent (T) to that side of the wheel corresponding therewith. As for example the row of teeth in the model for the month of February in ordinary years is situated on that side of the day of the month wheel next the corrugated disk (I) thus requiring the elevation on the disk to be the highest in order to raise the arm ($x^1$) sufficiently to cause the arm to bring the detent (T) to that side of the wheel (Q) next the disk (I). The row of 29 teeth for the same month being on the opposite side of the wheel, thus requires a notch on the disk sufficiently deep to allow the spring ($x^2$) to drawn down the arm ($x^4$) to move the detent to the opposite side of the wheel (Q). And so on with the other notches or elevations they being deep or prominent according to the location of the rows having the requisite number of teeth for the days of the month which they are intended to represent. Or instead of the corrugated disk (I) communicating the neccessary changes to the detent upon a wheel having four rows of teeth; it may by a new arrangement of the disk be made to operate the detent (T,) directly by causing the latter to rest upon its periphery, but in such a case as this the rockshaft (X,) and wheel (Q) are dispensed with and a wheel of a single row of 31 teeth substituted in lieu thereof, three of which are cut down, the first lower than the other teeth, the 2d lower than the 1st, while the 3d is cut down lower than the 2nd, as shown in Fig. 3, but when such an arrangement is made the projection on the disk (I) for the month of February of 28 days must be made the highest, when the elevation for February of leap year the next, and so on with those months having 30, or 31, days, the last requiring the lowest notch, the cause of which is self evident as in the case of the month of Feb., the elevation of the disk must be high enough to cause the detent to override the teeth on the wheel for the month of February in leap year, as well as those having 30 and 31 days.

Having thus described our invention what we claim as new and desire to secure by Letters Patent is—

The quadrennially revolving corrugated disk (I) when operating in the manner substantially as and for the purposes herein set forth.

In testimony whereof we hereunto subscribe our names.

WM. H. AKINS.
JOSEPH C. BURRITT.

Witnesses:
J. B. HAMMOND,
URI. CLUNK.